United States Patent
Fishman

[15] 3,691,118
[45] Sept. 12, 1972

[54] LEATHER PRINTING COMPOSITION

[72] Inventor: Murray Fishman, Wantagh, N.Y.

[73] Assignees: Nicholas R. Loscalzo, Suffolk County; Frank Coloprisco, Wantagh, N.Y.; part interest to each

[22] Filed: Jan. 12, 1968

[21] Appl. No.: 697,328

[52] U.S. Cl. ................260/19 UA, 106/29, 260/23, 260/23.3
[51] Int. Cl. .............................................C08g 5/20
[58] Field of Search ..106/30, 29; 260/19, 33.2, 23.3, 260/23

[56] References Cited

UNITED STATES PATENTS

| | | | |
|---|---|---|---|
| 2,784,164 | 3/1957 | Ahlman et al. | 261/19 |
| 3,047,526 | 7/1962 | Stephens et al. | 117/142 |
| 3,097,105 | 7/1963 | Edmonds | 260/848 |
| 3,357,938 | 12/1967 | Eisenwiener | 260/33.2 |
| 3,441,434 | 4/1969 | Jezl | 260/19 |

OTHER PUBLICATIONS

Symonds et al., "Handbook of Plastics" 1949, TP 986, A2S48 (pp. 648 to 659 relied on)

Primary Examiner—Donald E. Czaja
Assistant Examiner—William E. Parker
Attorney—Stoll and Stoll

[57] ABSTRACT

Compositions for printing on leather are obtained from compositions containing an oleoresinous varnish, a penetrating agent and a friction-reducing agent.

4 Claims, No Drawings

LEATHER PRINTING COMPOSITION

BACKGROUND OF THE INVENTION

Various methods have been proposed heretofore for printing on or decorating leather, which is to be used, for example, in forming the upper, that is, the non-sole portion, of shoes. Such methods, however, have been generally ineffective and have found little acceptance in the art. Methods for decorating shoe soles by printing have heretofore been totally ineffective. The accepted method for decorating leather to date is by dyeing.

OBJECTS OF THE INVENTION

It is, accordingly, an object of the present invention to provide a leather printing composition. Another object of the present invention is to provide printing compositions which can be used in decorating leather. A further object is to provide a method for decorating leather which is less time consuming than dyeing. These and other objects of the present invention will be apparent from the following description.

SUMMARY OF THE INVENTION

It has now found that compositions for effectively printing on leather comprise a combination of an oleoresinous varnish, a penetrating agent, and a friction reducing agent.

The oleoresinous varnish is a mixture of a drying oil and a varnish resin. The varnish should be a medium-oil or a long oil varnish. The penetrating agent serves to create a firm bond between leather and the oleoresinous varnish. The penetrating agent is an ester of an alcohol or a glycol. The glycol may be partially etherified. The friction reducing agent serves to impart a mar-resistant surface and "slickness" and "slip" to the coating.

DETAILED DESCRIPTION

The compositions of the present invention comprise an oleoresinous varnish, a penetrating agent and a friction reducing agent.

The oleoresinous varnishes are mixtures of drying oils and varnish resins, usually combined by a heating or "cooking" process and then thinned or "reduced" to normal viscosity with a volatile solvent. Metallic dryers may be cooked in during the thermal processing, or they may be added as solutions to the finished varnish. The reasons for adding a hard resin to the oil are to shorten the drying time, to increase the hardness of the film, to improve the gloss, to improve water and chemical resistance and to increase durability.

By a medium-oil varnish is meant a varnish containing from about 18 to about 30 gallons of oil per 100 pounds of resin. By a long-oil varnish is meant a varnish containing from about 30 to about 60 gallons of oil per 100 pounds of resin. The resin may be natural or synthetic. Examples of suitable resins are maleic-modified rosin resin, phenolic resin, modified phenolic resin, coumarone-indene resins, terpene resins, terpene-phenolic resins and petroleum resins.

The function of the varnish is to provide an oxidizing coating which forms a quick drying surface on the leather. The oleoresinous varnish is used in an amount of from about 35 percent to about 60 percent by weight based on the total weight of oleoresinous varnish, penetrating agent and friction reducing agent, preferably in an amount of from about 40 percent to about 55 percent by weight, and most preferably from about 45 percent to about 51 percent by weight.

Examples of suitable esters are, for example the lactate esters of $C_4$-$C_5$ alcohols such as, butyl lactate, isobutyl lactate, amyl lactate, and isoamyl lactate. Examples of suitable etherified esters are the butyl and isobutyl ethers of diethylene glycol monoacetate, etc. Those skilled in the art will understand that other materials may be used in place of those specifically mentioned. The penetrating agent is used in quantities of from about 5 percent to about 15 percent by weight based on the total weight of varnish, penetrating agent and friction reducing agent, preferably from about 8 percent to about 12 percent by weight.

Suitable friction-reducing materials are, for example, polyethylene, talc, paraffin wax, petrolatum, or similar material. This material is generally present in an amount of from about 25 percent to about 55 percent by weight based on the total weight of oleoresinous varnish, penetrating agent and friction reducing agent, preferably, from about 35 percent to about 45 percent by weight.

Various other materials may be added to modify the performance of the composition. For example, dryers may be used to speed up drying. Suitable dryers are the heavy metal soaps of organic acids, particularly, heavy metal soaps of lead, cobalt and manganese. Specific compounds are the linoleates resinates, napthenates, octoates or tallates of lead, cobalt, manganese, zinc or calcium. Coloring agents may be added to achieve the desired color. By the proper selection of coloring agents, any desired color may be obtained.

The following example illustrates the present invention without, however, limiting the same thereto:

To 4.5 parts by weight of 1:1 phenolic resin-linseed oil oleoresinous varnish, there were added 2.75 parts by weight of polyethylene wax paste, 1 part of Butyl Carbitol acetate the acetate of the mono-butyl ether of diethylene glycol and 1 part of talc. About 1.5 parts of cobalt naphthenate were added as dryer. As colorants there were added 11 parts of Rex Orange pigment, 5.5 parts of carbon black and 2.75 parts of Watching Red pigment. After thorough mixing, the foregoing composition was printed on leather soles in a letter press. The composition adhered perfectly to the sole and could be applied in any desired pattern. The coating did not crack or separate from the sole on repeated flexing. Soles treated with this composition were more resistant to staining and scratching than untreated soles.

The compositions of the present invention protect leather soles while at the same time improving their appearance. The coating of the present invention also serves to increase the water resistance of soles.

The compositions of the present invention are not limited to leather soles, but are also eminently suitable for printing all types of leather. The leather printing compositions of the present invention may be applied by any printing process, for example, letter presses or offset presses. In the case of leather soles, a letter press is the only practical method of application. Thinner leather articles may be printed in letter presses or offset presses.

What is claimed is:

1. A composition for printing leather which comprises
    from about 35 percent to about 60 percent by weight of an oleoresinous varnish consisting of linseed oil and a varnish resin selected from the group consisting of maleic modified rosins, phenolic resins, linseed modified phenolic resins, coumaroneindene resins, terpene resins, and petroleum resins;
    from about 25 percent to about 55 percent by weight of a friction reducing material selected from the class consisting of polyethylene, talc, paraffin wax, and petrolatum; and
    from about 5 percent to about 15 percent by weight of a penetrant selected the class consisting of lactate esters of $C_4$-$C_5$ alcohols, butyl esters of diethylene glycol acetate and isobutyl esters of diethylene glycol acetate, said percentage being by weight based on the weight of the total composition.

2. A composition according to claim 1 wherein said oleorsinous varnish comprises an equal mixture of a phenolic resin and linseed oil.

3. A composition according to claim 1 wherein said oleoresinous varnish comprises an equal mixture of phenolic resin and linseed oil, wherein said friction reducing material is a polyethylene wax and wherein said penetrant is the acetic acid ester of the mono-butyl ether of diethylene glycol.

4. A composition according to claim 3 wherein the oleoresinous varnish is present in 4.5 parts by weight, the friction reducing material is present to an extent of 2.7 parts by weight and wherein said penetrant is present to an extent of one part by weight.

* * * * *

It is to be understood that while the invention has been described in detail, variations and modifications may be made without departing from the invention as defined in the appended claims.